March 15, 1955 J. J. BIEGER ET AL 2,704,085
VALVES FOR LOW TEMPERATURE OPERATION
Filed Sept. 4, 1952
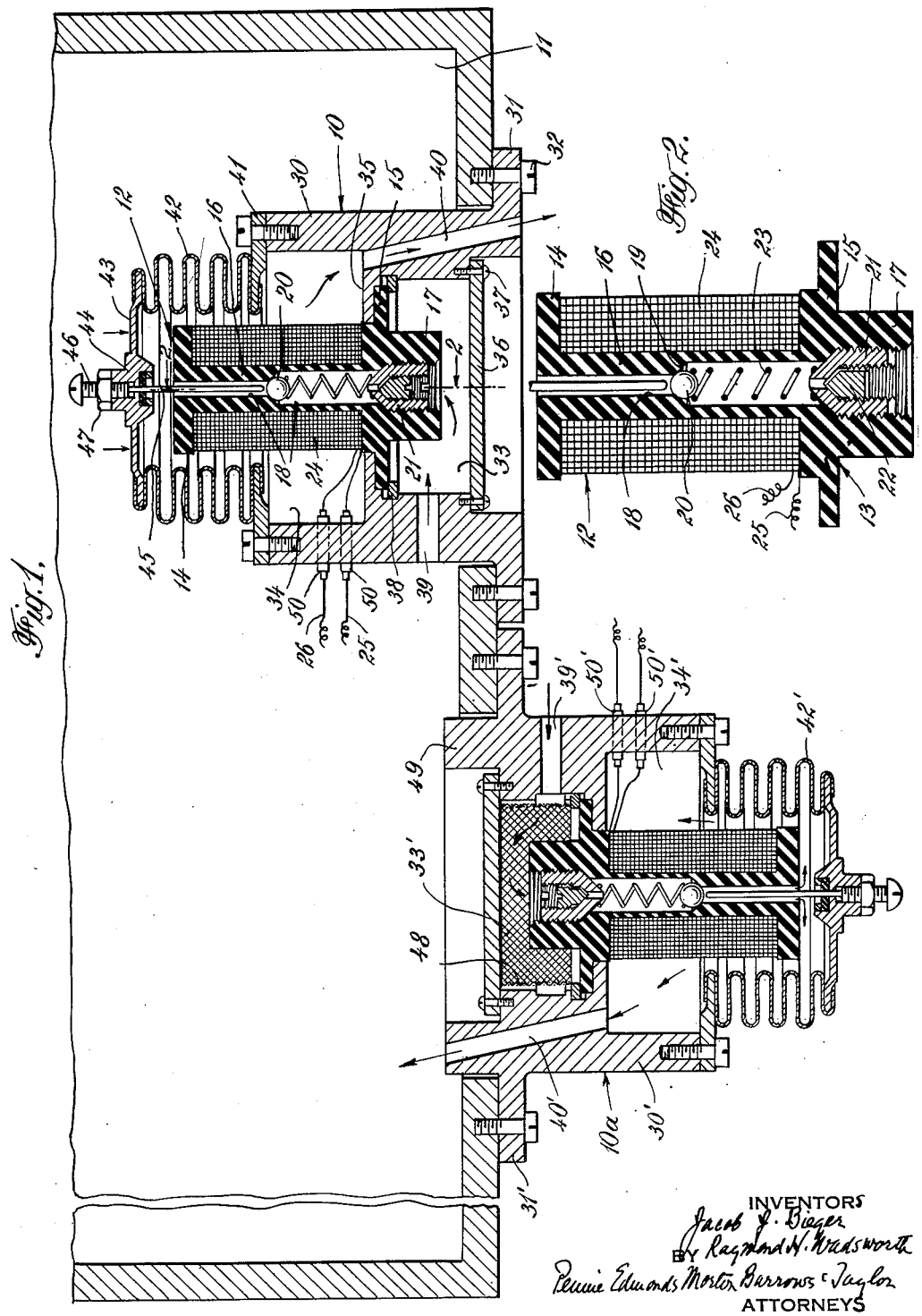
INVENTORS
Jacob J. Bieger
Raymond H. Wadsworth
BY Pennie Edmonds Morton Barrows & Taylor
ATTORNEYS

2,704,085

VALVES FOR LOW TEMPERATURE OPERATION

Jacob J. Bieger, Queens Village, N. Y., and Raymond H. Wadsworth, South Orange, N. J., assignors to Daco Machine & Tool Co., Brooklyn, N. Y., a partnership Application September 4, 1952, Serial No. 307,848

10 Claims. (Cl. 137—81)

This invention relates to valves suitable for use at low temperatures and is concerned more particularly with a novel valve, which is provided with means for preventing moisture within the valve from congealing and interfering with the operation of the valve, either by causing sticking of the gate element or by constricting flow through the valve. The new valve may be advantageously employed as part of a novel assembly operating automatically to permit flow from a region of high pressure to one of low pressure, until the pressure is the same in the two regions. Such an assembly has numerous applications, as, for example, a pair of the assemblies may be installed on an aircraft to maintain the pressure in the interior of a sealed housing for optical or electronic equipment in a desired relation to the outside pressure, as the craft ascends or descends. An ordinary spring-loaded valve would not be satisfactory for use in such an assembly because of the freezing of moisture within the valve as a result of the fall in temperature occurring as the craft ascends, but the new valve functions with complete reliability under such conditions. The invention, accordingly, includes both the new valve and the new valve assembly, of which the valve forms a part.

For a better understanding of the invention, reference may be made to the accompanying drawing, in which Fig. 1 is a cross-sectional view of an installation including a pair of the new valve assemblies including the new valves; and Fig. 2 is a vertical cross-sectional view of the new valve.

A typical installation of the valve assembly of the invention is illustrated in Fig. 1, in which two assemblies 10, 10a are employed for maintaining the pressure within a casing 11 at approximately the same value as the pressure outside the casing. The casing may be that enclosing electronic or optical equipment installed on an aircraft, and the assembly 10 operates to release pressure from within the casing during the ascent of the aircraft, while the assembly 10a admits the atmosphere into casing 11, when the aircraft descends.

The assembly 10 comprises a valve 12, shown in Fig. 2 as including a frame 13 of insulating material, which is provided with a pair of flanges 14, 15, connected by a core 16. A block 17 projects beyond flange 15 and a passage 18 extends concentrically through the core and block. Within the core, the passage has sections of different diameters connected by a shoulder 19 forming a seat, which is normally engaged by a movable gate element 20, which is of magnetic material and preferably has the form of a ball. The portion of the passage within the block 17 is enlarged and contains an orifice member 21, which is of magnetic material. The member may provide a fixed orifice or may include a plug 22 of magnetic material threaded into the orifice member and adjustable to regulate the size of the orifice. A spring 23 of non-magnetic material normally holds the ball 20 against seat 19 and the end of the spring remote from the ball may be seated against the orifice member. An electrical coil winding 24 of a number of turns of insulated wire is wound upon the core 16 between flanges 14, 15, the ends of the wire being shown at 25, 26.

The valve assembly 10 includes a housing 30, which is adapted to be inserted through an opening in the wall of casing 11 and held in place by a flange 31 at one end of the housing, which is secured to the casing around the opening by screws 32. The housing 30 is hollow and it is divided into an inlet chamber 33 and an outlet chamber 34 by an internal flange 35. The inlet chamber 33 is closed by a plate 36 seated on an internal shoulder within the housing and held in place by screws 37. Valve 12 is mounted within flange 35 with flange 15 of the frame of the valve seated against one face of flange 35 and held in place in any convenient manner, as by a snap ring 38. The valve is mounted in such position that the block 17 containing the orifice member, lies within the inlet chamber 33. Access to the inlet chamber from the interior of casing 11 is afforded by an inlet 39 through the wall of housing 30 and an outlet passage 40 leads from the interior of the outlet chamber 34 through the wall of housing 30 and flange 31.

A flat ring 41 is mounted on the end of housing 30 containing the outlet chamber 34 and a metallic bellows 42 is attached to the ring and extends outwardly therefrom. At its outer end, the bellows is closed by a plate 43 provided with a central boss 44, through which extends a stem 45. The outer end of the stem engages a screw 46 threaded into the boss and held in place by a locknut 47. The end of the frame of the valve 12 mounted on flange 35 extends outwardly through ring 41 and into the interior of the bellows and the stem 45 enters the passage 18 through the core of the frame of the valve and terminates close to the ball 20.

The valve assembly 10a is generally similar to the valve assembly 10, except that a cylindrical screen 48 is mounted within the inlet chamber 33' in such position that air entering through the inlet 39' passes through the screen before entering chamber 33'. Also, the housing 30' of the assembly 10a is provided with a tubular extension 49 beyond the flange 31'. The assembly 10a is mounted with the extension 49 entering an opening in the wall of casing 11 and the flange 31' lies against the outer surface of the wall and is secured thereto in the same manner as flange 31.

In both assemblies, the leads 25 and 26 of the winding on the frame of each valve are passed through insulating bushings 50, 50' in openings in the walls of the respective housings and are connected to a suitable source of alternating current, which energizes the windings throughout the operation of the assemblies.

At the start of the flight of the aircraft carrying the installation shown in Fig. 1, the pressure within casing 11 may be assumed to be the same as that outside the casing and, as the aircraft ascends, the outside pressure falls, while that within the casing remains constant. When the difference between the inside and outside pressures is sufficient, the bellows 42 collapses and moves stem 45 to force the ball 20 from its seat. Air from the interior of casing 11 may then enter the inlet chamber 33 through the inlet 39 and pass through the orifice member 21 and through the passage through the frame of the valve 12 into the interior of the bellows 42. The air then enters the outlet chamber 34 and leaves through the outlet 40. The ball 20 is held from its seat, until the pressure within casing 11 has fallen to approximately that outside the casing, whereupon the bellows resumes its original condition, so that the stem 45 releases the ball and the latter is forced against its seat by spring 23.

When the aircraft begins to descend, the pressure outside the casing 11 increases and tends to collapse the bellows 42' of valve assembly 10a. When the pressure on the bellows is sufficient, the stem actuated by the bellows unseats the ball within the valve of assembly 10a and air from outside the casing enters the inlet chamber 33' through inlet 39'. The air travels through the passage through the frame of the valve into the bellows and enters the outlet chamber 34', from whence it issues through the outlet passage 40' into the interior of casing 11. When the pressure within the casing, plus the pressure of the spring, is equal to the pressure outside the casing, the bellows 42' resumes its original condition and permits the ball of the valve in assembly 10a to seat.

In the ascent of the aircraft, the temperature may fall through many degrees, as, for example, from an ambient temperature of 95° F. to −60° F. During the drop in temperature, moisture in the air may condense within the valves in the assemblies 10 and 10a and, if nothing were done to prevent, the moisture might close the orifices and also cause the balls to stick to their seats. The energization of the coil windings of the two valves produces an alternating magnetic flux, which causes heat to be generated in the balls and the orifice members of the valves. As a result, these parts are kept at a temperature sufficient to prevent the freezing of moisture. In a typical installation, the coil windings contain such a number of turns in relation to the voltage, frequency, and wattage of the current supply that the balls and orifice members are kept well above freezing temperatures. In order that the magnetic field may not cause a displacement of the ball of a valve from its seat, the frame of the valve and the winding are so constructed that the magnetic center of the coil is within the ball and approximately coincides with the magnetic center of the ball when the latter is seated. The ball of the valve is then held normally against its seat by the spring and is displaceable only by the action of bellows of the assembly.

We claim:

1. A valve, which comprises a frame member of nonmagnetic material having a passage therethrough, the passage having a circumferential shoulder serving as a seat, a movable gate element of magnetic material within the passage engageable with the seat to close the passage, a spring urging the gate element toward the seat, and an electrical coil winding on the frame member and encircling the passage, the magnetic center of the winding lying approximately at the magnetic center of the gate element, when the latter is against the seat.

2. A valve, which comprises a frame member of nonmagnetic material having a passage therethrough, the passage having a circumferential shoulder serving as a seat, a movable gate element of magnetic material within the passage engageable with the seat to close the passage, an orifice member of magnetic material restricting flow through the passage, a spring seated at one end on the orifice member and, at the other, acting on the gate element to urge it toward the seat, and an electrical coil winding on the frame member and encircling the passage, the magnetic center of the winding lying approximately at the magnetic center of the gate element, when the latter is against the seat.

3. A valve, which comprises a bobbin of insulating material having a core with an axial passage therethrough, the passage having a circumferential shoulder serving as a seat, a movable gate element of magnetic material within the passage engageable with the seat to close the passage, a spring urging the gate element toward the seat, an orifice member of magnetic material restricting flow through the passage, and an electrical coil winding on the bobbin core, the magnetic center of the winding lying approximately at the magnetic center of the gate element, when the latter is against the seat, and the orifice member lying within the magnetic field of the winding.

4. A valve, which comprises a frame member of nonmagnetic material having a passage therethrough, the passage having a circumferential shoulder serving as a seat, a movable gate element of magnetic material within the passage engageable with the seat to close the passage, a spring urging the gate element toward the seat, an orifice member of magnetic material removably mounted in the passage and restricting flow through the passage, and an electrical coil winding on the frame member and encircling the passage, the magnetic center of the winding lying approximately at the magnetic center of the gate element, when the latter is against the seat.

5. A valve, which comprises a bobbin of insulating material, the bobbin including a core, flanges at opposite ends of the core, and a block forming an extension of the core beyond one flange, the core and block having an axial passage therethrough and the passage within the core having a circumferential shoulder serving as a seat, a movable gate element of magnetic material within the passage and engageable with the seat to close the passage, an orifice member within the passage within the block restricting flow through the passage, and an electrical coil winding on the core between the flanges, the magnetic center of the winding lying approximately at the magnetic center of the gate element, when the latter is against the seat.

6. A valve assembly, which comprises a housing containing a chamber with an inlet and a chamber with an outlet, a frame member mounted within the housing to separate the chambers from each other, the frame member having a passage through it, the passage having sections of different diameter connected by a circumferential shoulder forming a seat, a movable gate element of magnetic material within the passage section of larger diameter and engageable with the seat to close the passage and cut off communication between the chambers, a spring urging the gate element toward the seat, an orifice member of magnetic material restricting flow through the passage, an electrical coil winding on the frame member encircling the passage, the magnetic center of the winding lying approximately at the magnetic center of the gate element, when the latter is against the seat, and barometrically operated means exposed externally to the pressure of the medium, to which the inlet chamber is open through the inlet, and internally to the pressure of the medium within the outlet chamber, said means including a stem entering the small diameter section of the passage and movable to engage and unseat the gate element, when the external pressure on said means exceeds the internal pressure by a definite amount.

7. A valve assembly, which comprises a housing containing a chamber with an inlet and a chamber with an outlet, a frame member mounted within the housing to separate the chambers from each other, the frame member having a passage through it, the passage having sections of different diameter connected by a circumferential shoulder forming a seat, a movable gate element of magnetic material within the passage section of larger diameter and engageable with the seat to close the passage and cut off communication between the chambers, a spring urging the gate element toward the seat, an orifice member of magnetic material restricting flow through the passage, an electrical coil winding on the frame member encircling the passage, the magnetic center of the winding lying approximately at the magnetic center of the gate element, when the latter is against the seat, a collapsible bellows mounted on the housing with its interior open through the end of the housing to the interior of the outlet chamber and its exterior lying within the medium entering the inlet chamber through the inlet, and a stem attached to the bellows and entering the small diameter section of the passage, the stem being operable to unseat the ball when the external pressure on the bellows exceeds the internal pressure by a definite amount.

8. A valve assembly, which comprises a housing containing a chamber with an inlet and a chamber with an outlet, a frame member mounted within the housing to separate the chambers from each other and extending through an opening in the end of the housing leading into the outlet chamber, the frame member having a lengthwise passage through it, the passage having sections of different diameter connected by a circumferential shoulder forming a seat, a movable gate element of magnetic material within the large diameter passage section and engageable with the seat to close the passage, a spring urging the gate element toward the seat, an orifice member of magnetic material restricting flow through the passage, an electrical coil winding on the frame member encircling the passage, the magnetic center of the winding lying approximately at the magnetic center of the gate element, when the latter is against the seat, a bellows attached to the end of the housing to enclose the end of the frame member projecting through the opening in said end, the interior of the bellows being in communication with the outlet chamber through said opening, and a stem attached to the bellows and extending into the small diameter section of the passage, the stem being movable upon collapse of the bellows to unseat the gate element.

9. A valve assembly, which comprises a housing containing an inlet chamber and an outlet chamber, a frame member mounted within the housing to separate the chambers from each other and having a passage through it, the passage having a circumferential shoulder forming a seat, a movable gate element of magnetic material within the passage and engageable with the seat to close the passage and cut off communication between the chambers, means urging the gate element toward the seat, an electrical coil winding on the frame member encircling the passage, the magnetic center of the winding lying approximately within the gate element, when the latter is against the seat, and means extending into the passage and operable to engage and unseat the gate element 10. A valve assembly, which comprises a housing containing an inlet chamber and an outlet chamber, a frame member mounted within the housing to separate the chambers from each other and having a passage through it, the passage having a circumferential shoulder forming a seat, a movable gate element of magnetic material within the passage and engageable with the seat to close the passage and cut off communication between the chambers, means urging the gate element toward the seat, an electrical coil winding on the frame member encircling the passage, the magnetic center of the winding lying approximately within the gate element, when the latter is against the seat, and barometrically operated means operable to engage and unseat the gate element.

References Cited in the file of this patent

UNITED STATES PATENTS 2,479,398     Parsons _____ Aug. 16, 1949

FOREIGN PATENTS 538,658     Germany _____ Nov. 16, 1931